United States Patent [19]
Maehara

[11] Patent Number: 5,171,072
[45] Date of Patent: Dec. 15, 1992

[54] BRAKE HYDRAULIC PRESSURE GENERATOR

[75] Inventor: Toshifumi Maehara, Saitama, Japan

[73] Assignees: Akebono Brake Industry Co., Ltd., Tokyo; Akebono Research and Development Centre, Ltd., Saitama, both of Japan

[21] Appl. No.: 524,425

[22] Filed: May 17, 1990

[30] Foreign Application Priority Data

May 19, 1989 [JP] Japan ................. 1-124451
May 19, 1989 [JP] Japan ................. 1-124452

[51] Int. Cl.$^5$ ............................. B60T 13/20
[52] U.S. Cl. ..................... 303/114.1; 303/11
[58] Field of Search ........... 303/114, 10, 11, 116, 303/119, 114 R, 114 PN, DIG. 3, DIG. 4

[56] References Cited

U.S. PATENT DOCUMENTS

| | | | |
|---|---|---|---|
| 4,340,257 | 7/1982 | Belart | 303/114 |
| 4,416,491 | 11/1983 | Belart et al. | 303/114 R |
| 4,641,894 | 2/1987 | Belart | 303/114 R |
| 4,641,895 | 2/1987 | Belart et al. | 303/113 TR |
| 4,678,243 | 7/1987 | Leiber | 303/114 R X |
| 4,687,259 | 8/1987 | Reinartz et al. | 303/114 |
| 4,753,074 | 6/1988 | Belart et al. | 303/114 R X |
| 4,767,165 | 8/1988 | Burgdorf | 303/114 PN X |
| 4,768,842 | 9/1988 | Ogino et al. | 303/113 X |
| 4,776,645 | 10/1988 | Seibert et al. | 303/116 X |
| 4,867,509 | 9/1989 | Maehara et al. | 303/114 X |
| 4,952,003 | 8/1990 | Okubo | 303/116 X |

Primary Examiner—Robert J. Oberleitner
Assistant Examiner—Alfred Muratori
Attorney, Agent, or Firm—Finnegan, Henderson, Farabow, Garrett and Dunner

[57] ABSTRACT

A brake hydraulic pressure generator is provided which employs a first booster piston which applies a brake pedal treading force to a brake piston and a second booster piston which selectively additively increases the braking pedal treading force applied to the brake piston. The second booster piston is operated by hydraulic fluid pressure supplied from an auxiliary hydraulic pressure source.

16 Claims, 8 Drawing Sheets

BRAKE HYDRAULIC PRESSURE GENERATOR

BACKGROUND OF THE INVENTION

1. Field of the Invention

The present invention relates to a brake hydraulic pressure generating apparatus for increasing a brake pedal treading force during vehicle braking period.

2. Description of the Related Art

Typically, in a brake hydraulic pressure control apparatus for a vehicle, hydraulic pressures in two braking systems are controlled by two pistons. The hydraulic pressure chambers whose pressures are controlled by those two pistons are connected to wheel cylinders by fluid passages. The pistons are connected to the brake pedal through a vacuum booster as a toggle joint by making use of a negative pressure of the engine.

With such a configuration, when the brake pedal is operated, a force several times larger than the treading force of the brake pedal is generated in the vacuum booster. The pistons are operated by that force. The hydraulic pressures generated in the chambers of the master cylinder are transferred to wheel cylinders and the pressures in the wheel cylinders rise thereby applying a braking force to the wheels.

The vacuum booster provided in the foregoing structure is expensive and large. In use, then, the vacuum booster occupies a relatively large area within the limited space provided for the engine. This is particularly true in smaller, low grade vehicles. In addition, the use of a vacuum booster leads to an increase the weight and cost of the engine as well as temperature rise.

Furthermore, only one power source system based on the negative pressure of the engine is used for the toggle joint because of cost and space limitations. Thus the amplifying ratio of the device is very large. If a problem occurs in the negative pressure source system when the vehicle is being braked, the braking force will be reduced. To compensate for this reduction in braking force, a remarkable increase in the pedal stroke is required. When this happens, the driver of the vehicle may mistakenly believe that no braking force is being applied. Such a situation is very dangerous.

SUMMARY OF THE INVENTION

It is an object of the present invention to provide a brake hydraulic pressure generator which does not require a vacuum booster but which produces a high braking force comparable to that generated when a booster is used and which is characterized by being small, light in weight and low in cost.

To achieve the foregoing object, a brake hydraulic pressure generator is provided which includes a booster piston which increases a brake pedal treading force when the booster piston is operated by a hydraulic pressure supplied by an auxiliary pressure source.

Other objects, features, and characteristics of the present invention, as well as the methods of operation and functions of the related elements of the structure, and the combination of parts and economies of manufacture, will become more apparent upon consideration of the following description and the appended claims with reference to the accompanying drawings, all of which form a part of this specification, wherein like reference numerals designate corresponding parts in the various figures.

A DETAILED DESCRIPTION OF THE PRESENTLY PREFERRED EXEMPLARY EMBODIMENT

Figure 1:
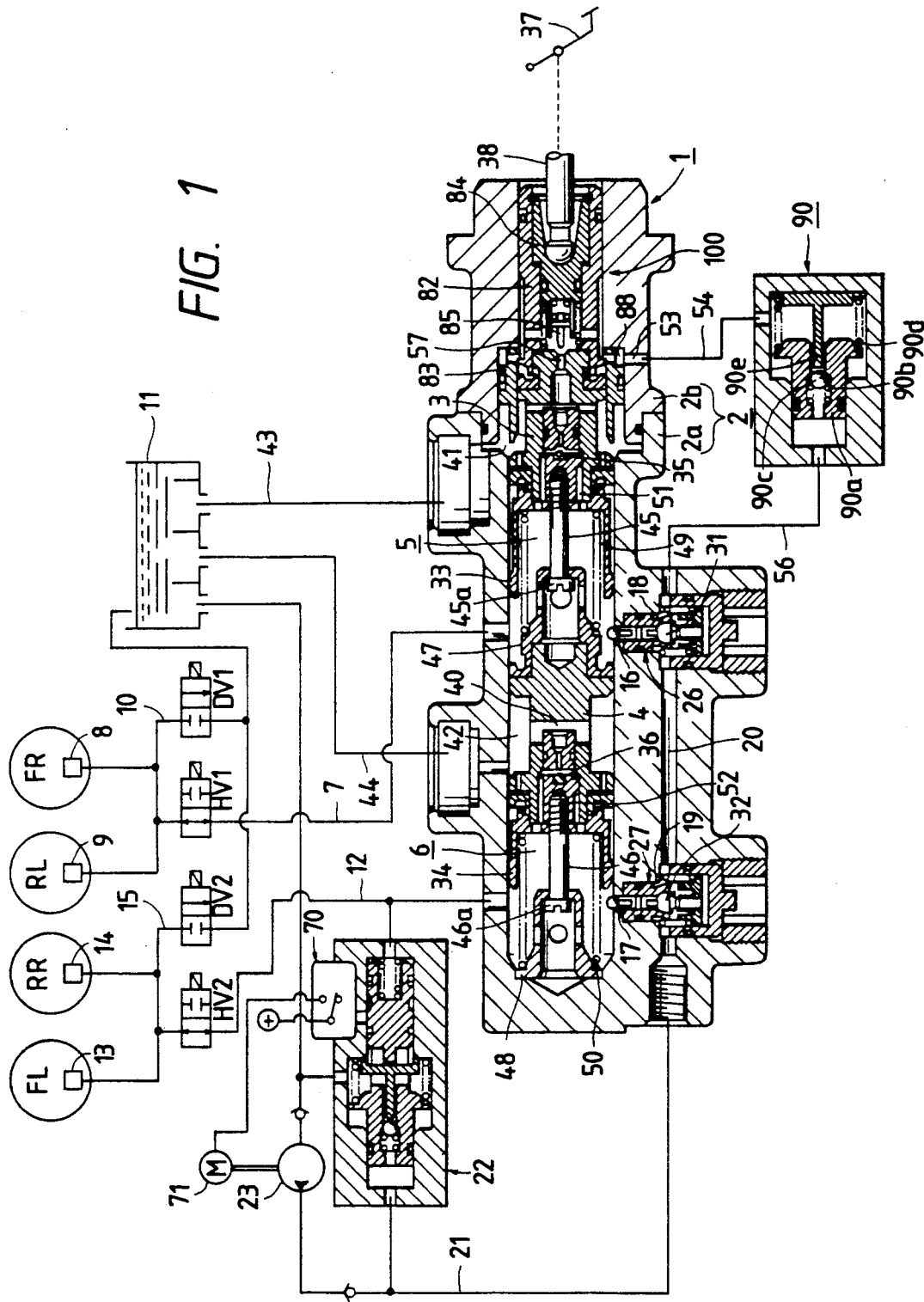
FIG. 1 is a schematic diagram showing an overall arrangement of the brake hydraulic pressure generator in accordance with an embodiment of the present invention.

FIG. 1 is a schematic illustration of the overall arrangement of a brake hydraulic generator provided in accordance with the first embodiment of the invention. The pressure generator has an anti-lock control function for a front wheel drive car with a two-system brake device of the cross-piping (X-piping) type. A master cylinder of the tandem type body 1 is provided with a housing 2 including front and back housing portions 2a and 2b shown respectively on the right and left hand sides of FIG. 1. A primary piston 3 and secondary piston 4 are provided within this housing 2. Hydraulic chambers 5 and 6 whose pressures are controlled by the pistons, are also formed within the housing.

Hydraulic chamber 5 which is controlled by primary piston 3 is connected to a wheel cylinder 8 for a front right wheel FR and another wheel cylinder 9 for a rear left wheel RL, through a hydraulic passage 7 which has a hold valve HV1 which is a normally open type electromagnetic valve. The wheel cylinders 8 and 9 are connected to a reservoir 11, through a hydraulic passage 10 having a decay valve DV1 which is a normally closed type electromagnetic valve.

Hydraulic pressure chamber 6 which is controlled by secondary piston 4 is connected to a wheel cylinder 13 for the front left wheel FL and wheel cylinder 14 for a right rear wheel RR, through a hydraulic passage 12 with a hold valve HV2 which is a normally open type electromagnetic valve. Wheel cylinders 13 and 14 are connected to reservoir 11 through a hydraulic passage 15 having a decay valve DV2 which is a normally closed type electromagnetic valve.

Valve chambers 18 and 19 which have orifices 16 and 17 in communication with chambers 5 and 6, respectively, are formed in the housing portion 2a of master cylinder body 1. Valve chambers 18 and 19 are interconnected to a fluid passage 20 formed in housing portion 2a. Chamber 19 is connected through a hydraulic passage 21 to the discharge port of a hydraulic pressure pump 23 which is an auxiliary hydraulic pressure source. The suction port of a pump 23 is connected to reservoir 11. Valve mechanisms 26 and 27 which have intake valves 31 and 32 respectively which serve as check valves are installed within chambers 18 and 19, respectively. Pump 23 is operated at least in an antilocking mode as described more fully below.

A hydraulic booster 100 which is operated by brake hydraulic pressure is disposed within housing portion 2b which is coupled to the rear portion of housing portion 2a. Booster 100 includes a first tubular booster piston 82 fixed to the rear right end of primary piston 3 as shown in FIG. 1. A second tubular booster piston 83 is slidably mounted to primary piston 3 and a reaction piston 84 is coaxially and slidably provided within first booster piston 82.

Figure 7:
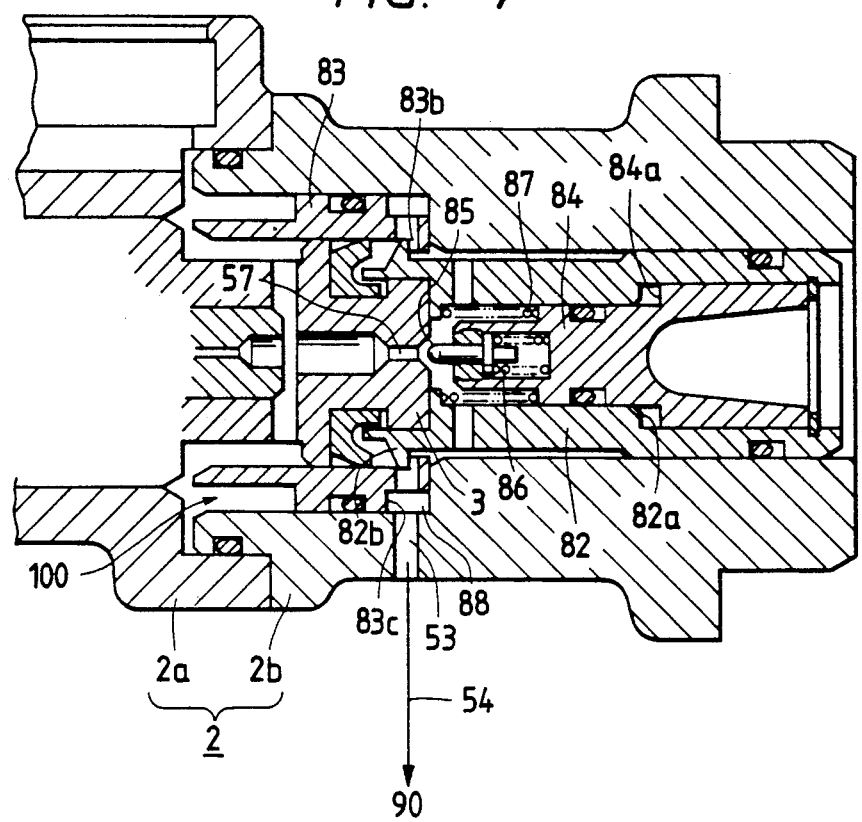
FIG. 7 is an enlarged sectional view of the booster piston provided in accordance with the present invention.

An enlarged sectional view of booster 100 is shown in FIG. 7. Reaction piston 84 contains a booster valve 85 which is movable in the actual direction of master cylinder body 1. Booster valve 85 is energized towards primary piston 3 by a valve spring 86. A hydraulic passage 57 which communicates with reservoir 11 is defined axially in primary piston 3. When the first booster piston 82 is moved to the left as shown in FIG. 7, booster valve 85 closes passageway 57. The right end of reaction piston 84 is coupled to a push rod 38 as shown in FIG. 1. Engaging stepped portions 84a and 82a (FIG. 7) are respectively formed in the outer circumferential wall of reaction piston 84 and the inner circumferential wall of first booster piston 82. A spring 87 is disposed between reaction piston 84 and first booster piston 82 and energizes the engaging stepped portions 84a and 82a so as to be spaced from one another when brake pedal 37 has not been pressed as shown in FIG. 7.

An enlarged diameter portion is formed in the inner circumferential wall of housing 2b of master cylinder body 1 and is open to housing portion 2a. The second booster piston 83 is disposed within this large diameter portion. A protruding portion 83b is formed on the right or rear end of the inner circumferential wall of the second booster piston 83. Another protruding portion 82b is formed on the forward or left end 35 of the outer circumferential wall of the first booster piston 82. When second booster piston 83 is moved to the left by hydraulic pressure, primary piston 3 together with first booster piston 82, which is fixed to primary piston 3, is also moved. The second piston 83 has on its right or rear end face an annular stepped portion 83c which is provided mainly for receiving hydraulic pressure. A boosting hydraulic pressure chamber 88 is provided on the right hand side of stepped portion 83c.

Tubular intake sleeves 33 and 34 for operating intake valves 31 and 32 are fixed respectively to primary piston 3 and secondary piston 4 and disposed inside hydraulic pressure chambers 5 and 6, respectively. Center valves 35 and 36 defined within primary and second pistons 3 and 4 are movable in an axial direction of the master cylinder body 1. In the state shown in FIG. 1 wherein brake pedal 37 has not been pressed and accordingly push rod 38 which is coupled to brake pedal 37 does not yet push primary piston 3, hydraulic pressure chambers 5 and 6 communicate with reservoir 11 through center valves 35 and 36 which are in an open position, passages 39 and 40 in pistons 3 and 4, ring chambers 41 and 42 formed around pistons 3 and 4 and hydraulic passages 43 and 44. Furthermore, boosting hydraulic pressure chamber 88 which is shown in FIG. 7 communicates with reservoir 11 by way of hydraulic path 57.

When the brake pedal 37 is pressed, push rod 38 is operated to push reaction piston 84. As can be seen in FIG. 7, movement of reaction piston 84 to the left collapses spring 87. Booster valve 85 then closes passage 57 of primary piston 3 to disconnect the boosting hydraulic pressure chamber 88 from reservoir 11. Then, the engaging portion 84a comes into contact with the engaging step portion 82a. When the brake pedal 37 is moved further, the first booster piston 82 and primary piston 3 which is fixed to the left side of piston 82 move to the left as shown in FIGS. 1 and 7.

When primary piston 3 moves to the left, center valve 35 moves to a closed position to disconnect hydraulic pressure chamber 5 from reservoir 11. Under this condition, the hydraulic pressure within hydraulic pressure chamber 5 increases. In turn, the brake fluid in chamber 5 is supplied to wheel cylinders 8 and 9 through hold valve HV1 which is normally open to brake wheels FR and RL in one of the brake systems. As the pressure increases in chamber 5, secondary piston 4 is operated to move its center valve 36 to a closed position and to disconnect hydraulic pressure chamber 6 from reservoir 11. The hydraulic pressure within hydraulic pressure chamber 6 then increases. The brake fluid from chamber 6 will then be supplied to wheel cylinders 13 and 14 through hold valve HV2 which is normally open to brake wheels FL and RR in the other brake system.

Positional relationships in operation among and of the foregoing structures are set and effected by the following members: stop bolts 45 and 46 coupled at one end with center valves 35 and 36, stop bushings 47 and 48 engaged with heads 45a and 46a coupled with the other ends of stop bolts 45 and 46, springs 49 and 50 loaded between stop bushings 47 and 48 and intake sleeves 33 and 34 in a compressed state, and springs 51 and 52 for urging center valves 35 and 36 into their closed positions.

Figure 8:
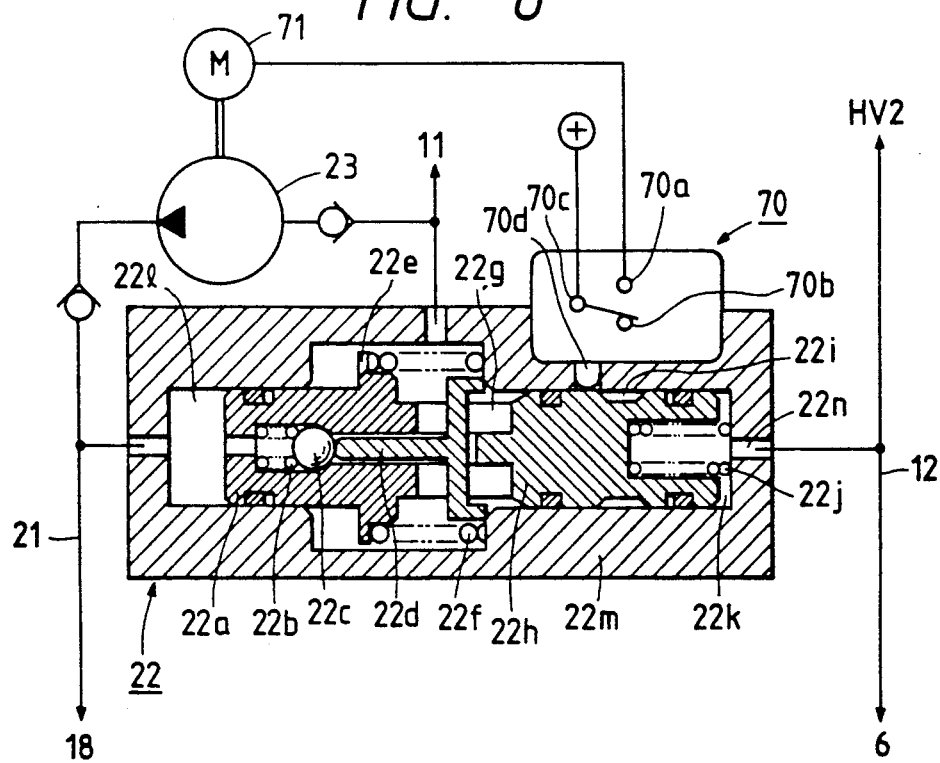
FIG. 8 is an enlarged cross-sectional view of a relief valve provided in accordance with the invention.

A relief valve 22 is disposed in the hydraulic passage 21 which connects the hydraulic pressure pump 23 to valve chamber 19. Relief valve 22 as shown in particular in FIG. 8, is made up of a piston 22a containing valve spring 22b and ball valve 22c, a relief spring 22f for energizing the piston 22a against the fluid discharged from the hydraulic pressure pump 23, a valve rod 22d which protrudes into the piston 22a in order to open ball valve 22c, a piston 22h which is disposed in contact with the right end of piston 22a (as seen in FIG. 8) and movable together with piston 22a, and a spring 22j for moving both pistons 22a and 22h.

Relief spring 22f is placed between a spring sheet 22e mounted to piston 22a and case 22m in a compressed state. A valve rod 22d is accommodated in a groove 22g formed in the piston 22a so as to allow smooth motion of piston 22a. When engaging ball valve 22c, it comes into contact with a part of case 22m. Spring 22j is placed between an opening of the rear end (on the right as shown in FIG. 8) of piston 22h and a part of the case 22m in a compressed state. A piston chamber 22k is defined by a portion of case 22m and the rear or right hand side of piston 22h. A hydraulic pressure in the hydraulic pressure chamber 6 of master cylinder body 1 is applied to piston 22h through hydraulic passage 12 and a bore 22n.

A microswitch 70 is mounted to a portion of case 22m in relief valve 22. Switch 70 is provided with two fixed contacts 70a and 70b and a movable contact 70c. Movable contact 70c is connected to a power supply (not shown). Fixed contact 70a is connected to motor 71 for driving hydraulic pressure pump 23. Fixed contact 70b is not electrically connected. As shown in FIG. 8 movable contact 70c is turned to fixed contact 70b when its actuator 70d is pushed by the outer circumferential surface of piston 22h. In this condition, power supply to the motor is shut-off. When actuator 70d is disposed in depression 22i which is formed in the outer circumferential surface of piston 22h, movable contact 70c of switch 70 is turned to fixed contact 70a and pump 23 operates.

The relief valve 22 operates as follows. When a pressure in hydraulic passage 21 rises, piston 22a moves to the right as shown in FIG. 8 against the force of relief spring 22f. As the piston 22a continues to move to the right, valve rod 22d contacts ball valve 22c and unseats ball valve 22c. Brake fluid is thus released from hydraulic passage 21 to reservoir 11. Accordingly, an excessively high pressure will not occur in passage 21. When the pressure drops in passage 21, on the other hand, pistons 22a and 22h will both move to the left as shown in FIG. 8. The actuator 70d of switch 70 will then fall into depression 22i to allow pump 23 to again operate.

Because piston 22a is urged to the left in FIG. 8 by spring 22f, piston 22a moves horizontally in accordance with a variation in the brake hydraulic pressure within passage 21. Movement of piston 22a varies the volume of chamber 221 in case 22m. Thus piston 22a reduces an impact pressure at the time of discharge of pump 23.

In addition, in relief valve 22, the direction in which ball valve 22c sits on the valve seat is coincident with direction in which brake fluid is released at the time of opening. Therefore, the hydraulic pressure and the valve spring 22b cooperate to push ball valve 22c against its valve seat thereby providing a reliable sealing of relief valve 22.

During a non-brake mode of this embodiment of the invention, brake fluid under a constant pressure which amounts to the load of relief spring 22f is supplied to hydraulic passage 21 and hydraulic passage 20 connecting valve numbers 18 and 19. As will be described in greater detail below, because a check valve 90 is provided which is closed, intake valves 31 and 32 move upwardly under the influence of a hydraulic pressure from chambers 18 and 19 as shown in FIG. 1 so that the tops 31a and 32a protrude into chambers 5 and 6, respectively. The load of relief spring 22f is selected so that when ball valve 22c comes into contact with valve rod 22d and is released, the brake hydraulic pressure is higher than a maximum hydraulic pressure to be generated in hydraulic chamber 5 and hydraulic chamber 6.

Check valve 90 is connected through hydraulic passages 56 and 54, respectively to valve chamber 18 and port 53. Check valve 90 includes a piston 90a which contains a valve spring 90b and a ball valve 90c, a spring 90d which pushes piston 90a against a hydraulic pressure acting on hydraulic passage 56, and rod valve 90e which protrudes into piston 90a to selectively open ball valve 90c. When the brake hydraulic pressure in passage 56 rises and reaches a predetermined value, piston 90a moves to the right as shown in FIG. 1 while pressing spring 90d. With this movement, valve rod 90e will push ball valve 90c and detach it from its valve seat. As a result, pressurized brake fluid in passage 56 is supplied to boosting hydraulic pressure chamber 88 through hydraulic passage 54 and port 53.

The load of spring 90d is selected such that when the ball valve starts to move upon being pushed by valve rod 90e, the brake hydraulic pressure is a predetermined amount greater than the set load of the relief spring 22f of relief valve 22.

When brake fluid is supplied to boosting hydraulic pressure chamber 88, the second booster piston 83 moves to the left as shown in FIGS. 1 and 7. At this time, the first booster piston 82 which is fixed to primary piston 3 engages second booster piston 83. Accordingly, with the movement of the second booster piston 83, primary piston 3 moves to the left. In this case, a hydraulic pressure PM is $$PM = (B/A) \times PA$$

where
A = area on which primary piston 3 is supplied
B = area of the annular pressure-receiving stepped portion 83c of the second boosting piston, and
PA = hydraulic pressure received by the second boosting piston 83.

The above formula demonstrates that the pressure PM in chamber 5 depends on the pressure applied to the chamber 88 and the ratio of the pressure receiving areas B/A.

Figure 2:
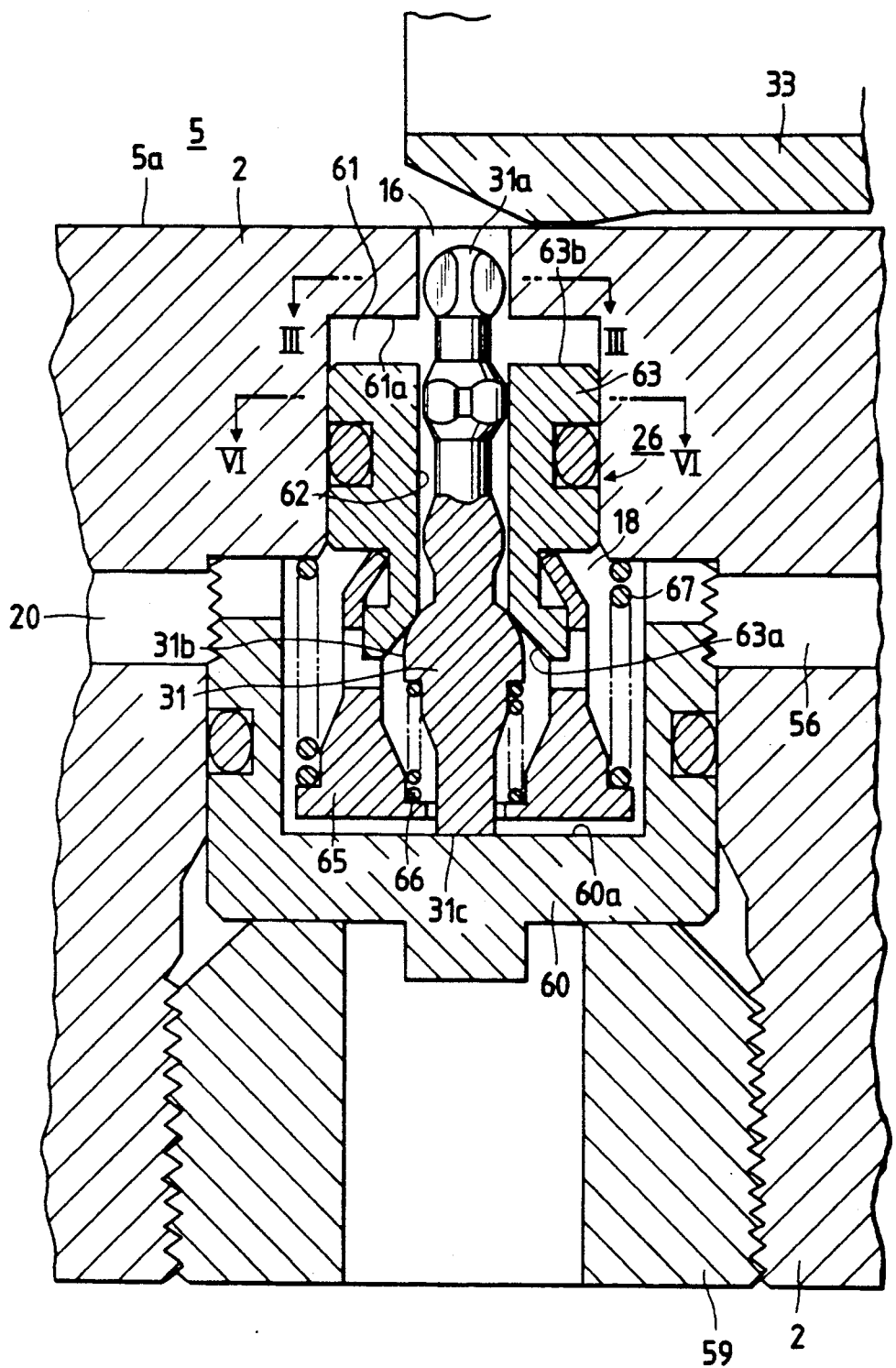
FIG. 2 is an enlarged view, partly in cross-section and partly broken away for clarity, of a valve mechanism provided in accordance with the invention.
Figure 3:
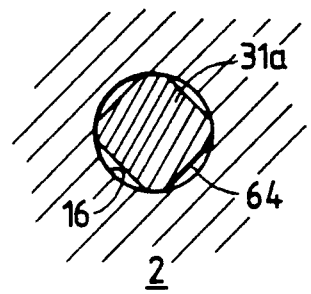
FIG. 3 is a cross-sectional view taken along line III—III in FIG. 2.
Figure 4:
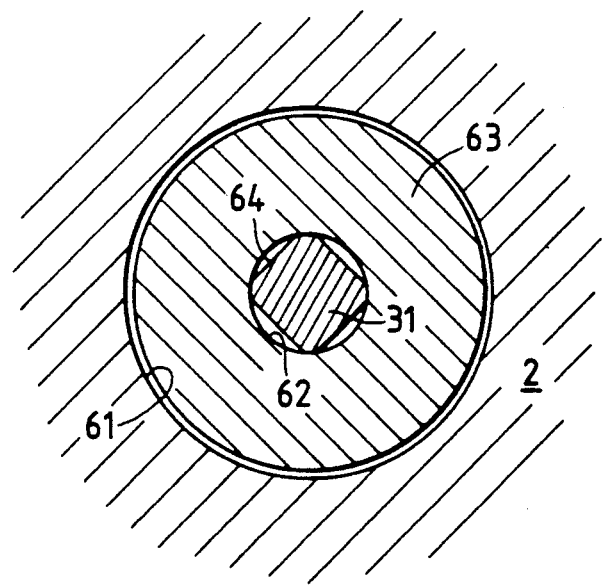
FIG. 4 is a cross-sectional view taken along line IV—IV in FIG. 2.

FIG. 2 is an enlarged sectional view showing the structural arrangement of valve mechanism 26 when no hydraulic pressure is applied to passage 20. Valve chamber 18 is defined by a cup shaped plug 60 fixed into housing 2 with a set screw 59. A piston chamber 61 is contiguous to and coaxial with orifice 16 which is in communication with hydraulic chamber 5. A piston 63 is provided within piston chamber 61 as a valve hold member. A bore 62 is defined centrally through piston 63. As shown in FIG. 2, piston 63 is slidable in a direction orthogonal to the inner circumferential surface 5a of hydraulic pressure chamber 5 and is disposed coaxial with orifice 16. A conical valve seat surface 63a is defined in an end of the central bore 62 of the piston 63 at the opposite end thereof with respect to orifice 16.

Intake valve 31 includes a rod-like poppet valve which is slidable through bore 62 of piston 63 and through orifice 16 so that the forward end 31a moves into and out of hydraulic pressure chamber 5. Intake valve 31 has a semispherical valve portion 31b which seats on the valve seat surface 63a of piston 63. The forward end portion 31a and the shaft of intake valve 31 have a substantially tetragonal cross-section having four corners which slidably contact the inner circumferential surface of the bore orifice 16 of housing 2 and the inner circumferential surface of bore 62 of piston 63 to prevent intake valve 31 from moving out of alignment with bore 62 when intake valve 31 is pressed down by intake sleeve 33, as discussed more fully below. Thus, the operation of intake valve 31 can be smooth and at the same time a hydraulic passage can be formed around the outer circumferential surface of intake valve 31.

Figure 6:
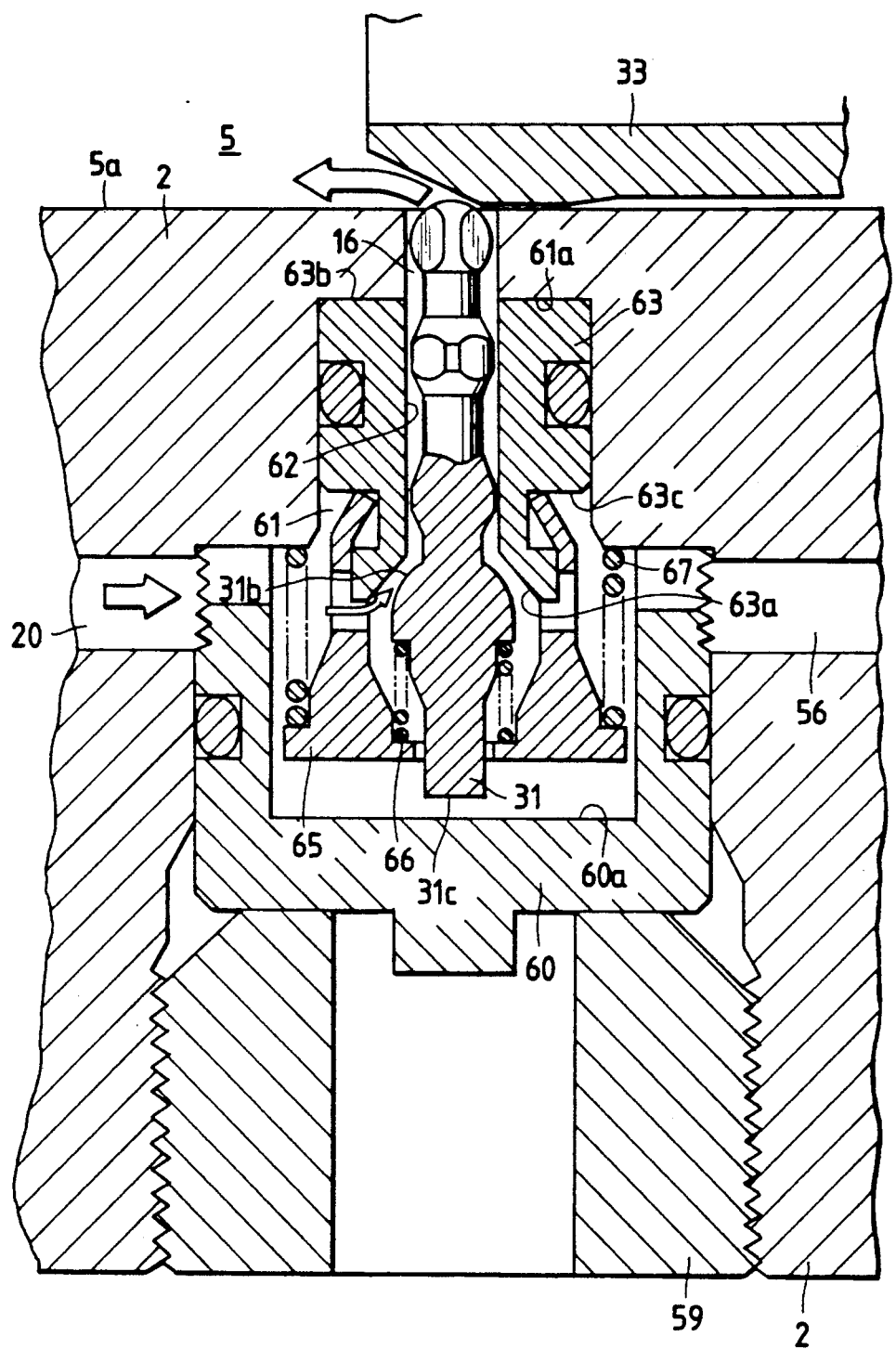
FIG. 6 is a cross-sectional view, partly in cross-section and partly broken away for clarity, of the valve mechanism of the invention for indicating an operation of the valve mechanism.

A spring holder 65 is interconnected with piston 63. A compressed check spring 66 is disposed between spring holder 65 and intake valve 31 so that valve portion 31b of intake valve 31 will be urged by a predetermined force so as to sit on the valve seat surface 63a of piston 63. Further, piston 63 is biased so as to be spaced from bore 16 by a compressed spring 67 disposed between spring holder 65 and a surface of valve chamber 18. The biasing force of set spring 67 is selected so as to be greater than that of check spring 66 so that piston 63 is kept in a state as shown in FIG. 6 by the biasing force of set spring 67 when the base end surface 31c of intake valve 31 comes into contact with inner wall surface 60a of plug 60. The biasing force of set spring 67 also acts between the valve seat surface 63a of piston 63 and valve portion 31b of intake valve 31.

Figure 5:
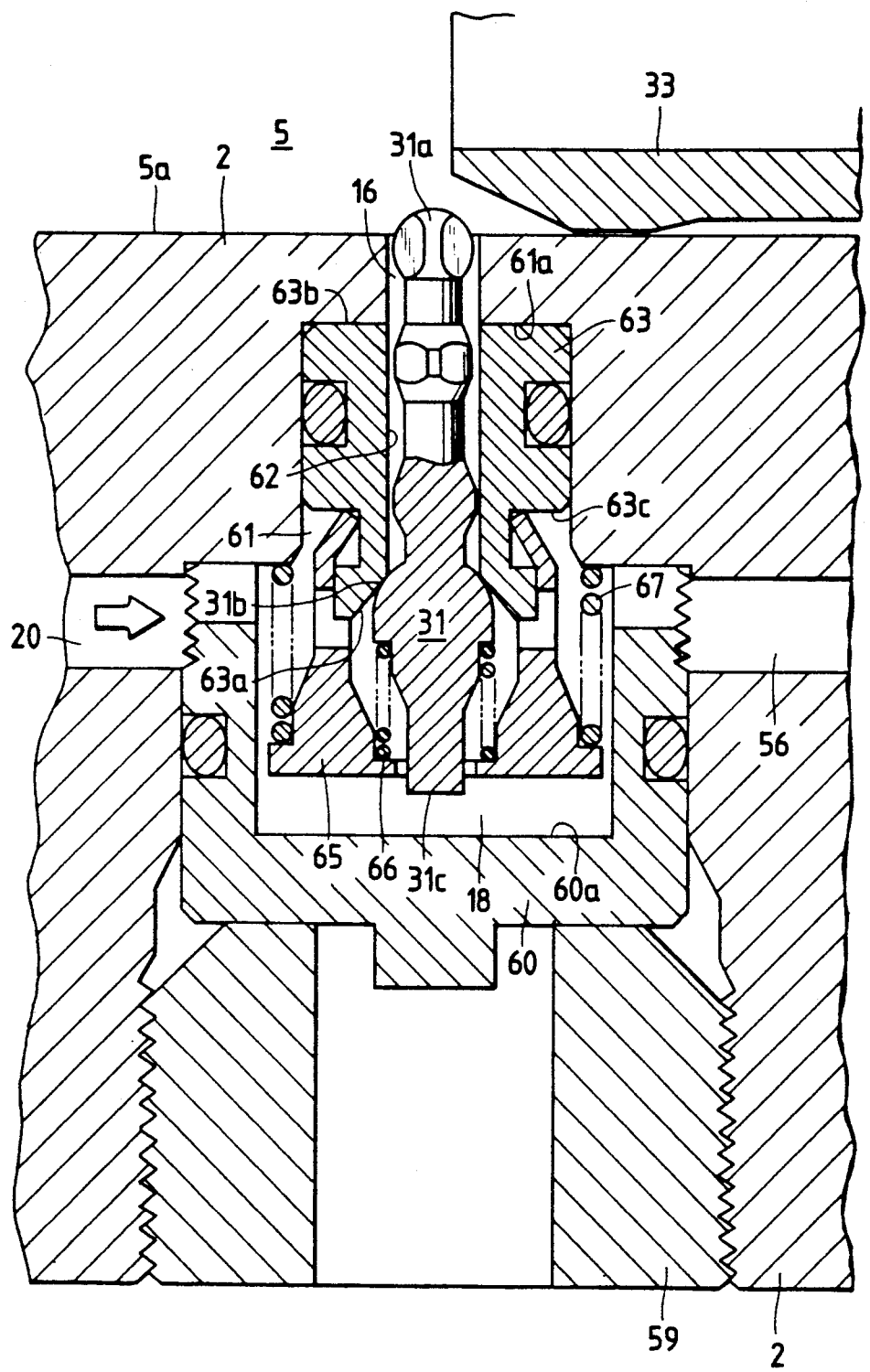
FIG. 5 is a cross-sectional view, partly in cross-section and partly broken away for clarity of the valve mechanism of the invention for indicating an operation of the valve mechanism.

In accordance with this embodiment of the invention, in a non-braking mode, the hydraulic pressure pump 23 does not operate but brake fluid at a hydraulic pressure corresponding to the load of relief spring 22f is constantly supplied to the hydraulic path 21 by relief valve 22 and passage 20 connecting valve chambers 18 and 19. Furthermore, because check valve 90 is closed, the hydraulic pressure determined by the load of relief spring 22f acts on valve chambers 18 and 19. Accordingly, a hydraulic pressure is applied to the end face 63c opposite to end face 63b of piston 63 as shown in FIG. 5. Under this condition, piston 63 moves towards orifice 16 against the force of spring 67 and intake valve 31 is held against valve surface 63a by the biasing force of spring 66. The end face 63b of the piston is in contact with wall surface 61a of piston chamber 61. Accordingly, intake valve 31 is disposed in a position with its forward end 31a protruding through orifice 16 into chamber 5.

In the non-braking mode, valve mechanism 26 is kept in the position shown in FIG. 5 until a stroke of primary piston 3 reaches a predetermined point and intake sleeve 33 comes into engagement with the forward end 31a of intake valve 31. When intake sleeve 33 engages forward and 31a of intake valve 31, it presses the intake valve downwardly against the biasing force of spring 66. Accordingly, valve portion 31b moves away from valve seat surface 63a of piston 63. Under this condition, if the brake hydraulic pressure of passage 21 is high, brake fluid is supplied to hydraulic pressure chamber 5.

The operation of the hydraulic booster will now be described. As noted above, the set load of the spring 90d of check valve 90 is higher than that of relief spring 22f of relief valve 22 by a predetermined amount. In the non-braking mode, when the hydraulic pressure in chamber 6 is kept at atmospheric pressure, only the set load of relief spring 22f acts on passage 56 and hence, check valve 90 is in its closed state. When the brake pedal is depressed, the resulting treading force is transferred through the action piston 84 to primary piston 3 so that the pressure in each of chambers 5 and 6 increases. At this time, the pressure in the piston chamber 22k of relief valve 22 also rises. Thus, piston 22h moves to the left. The switch 70 will in turn be turned on and pump 23 will begin to operate to push back piston 22h by supplying brake fluid to piston chamber 22l. As a result, the hydraulic pressure which is the load of relief spring 22f higher than the pressure in chamber 6 will applied to passage 56 which is connected through passage 21 to piston chamber 22l resulting in the opening of check valve 90. Accordingly, the high hydraulic pressure will act on the boosting hydraulic pressure chamber 88 exercising the function of the hydraulic booster.

The operation of the brake hydraulic pressure control apparatus shown in FIG. 1 will now be described with reference to FIG. 9.

Figure 9:
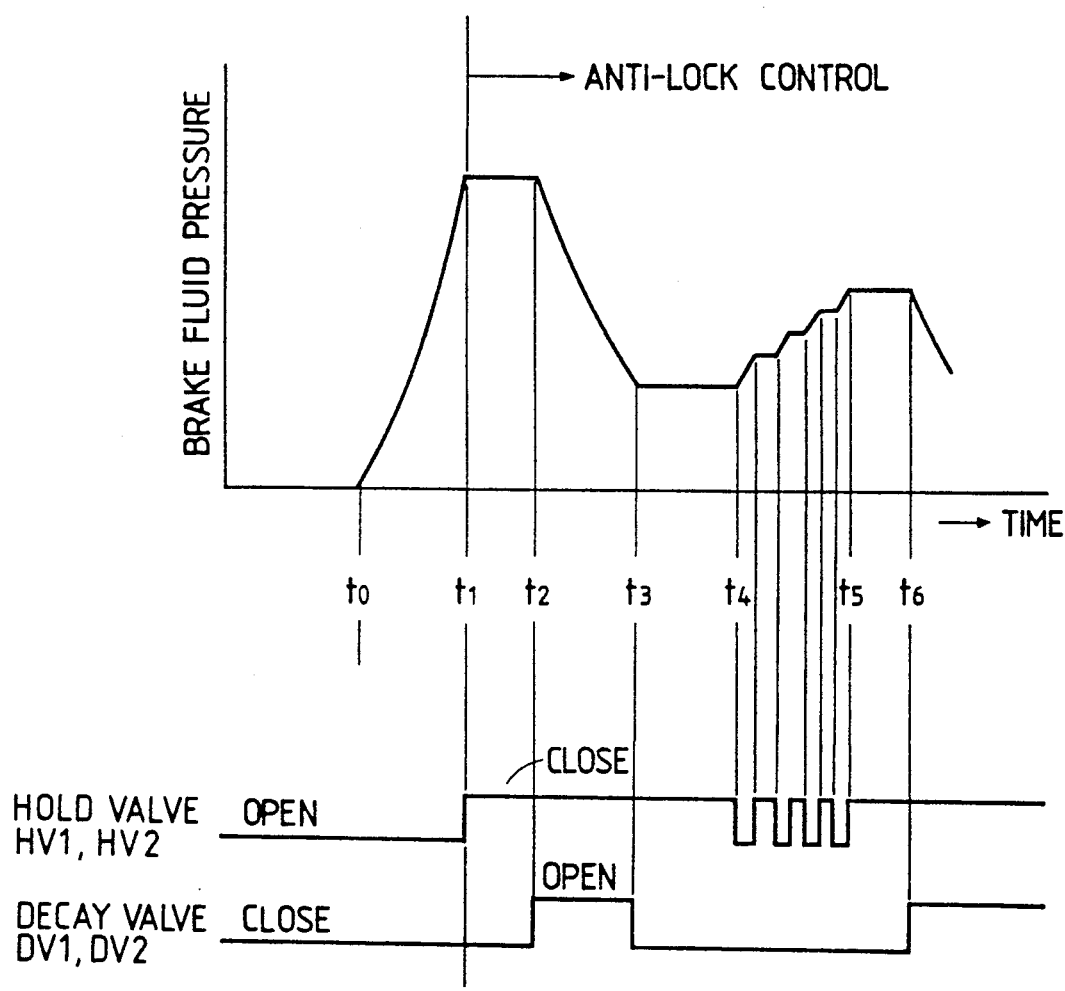
FIG. 9 is a timing graph for explaining an anti-lock control by the generator of FIG. 1.

FIG. 9 is a timing graph showing variations in the brake hydraulic pressure in the normal breaking mode and the subsequent anti-lock control mode together with opening and closing of hold valves HV1 and HV2 and the decay valves DV1 and DV2. Actually, the braking devices the two systems are individually controlled but in the description which follows, both braking systems concurrently operate and will be so described for simplicity.

(A) Normal braking mode (t0→t1)

In a condition where hold valves HV1 and HV2 are in an off (opened) state, while the decay valves DV1 and DV2 are in an off (closed) state as shown in FIG. 1, the brake pedal 37 is pressed by the driver of the vehicle. The push rod 38 will then push primary piston 3 towards the left as viewed in FIG. 1 thereby closing center valve 35. Secondary piston 4 also moves to the left to close its center valve 36. As a result, an increased pressure is generated in hydraulic pressure chambers 5 and 6. The high pressure is applied to wheel cylinders 8, 9, 13 and 14.

(B) Anti-lock control mode

As a result of the increasing pressure in wheel cylinders 8, 9, 13 and 14, the system speed (wheel speeds under control of each braking system) decelerates. When the deceleration exceeds a predetermined amount, and the same is detected, a control circuit containing a microcomputer will issue a hold signal. In response to the signal, the anti-lock control starts at a time t1.

(1) Hold mode (t1→t2)

At time t1, hold valves HV1 and HV2 are turned (closed) thereby closing hydraulic passage 70 which connects wheels cylinders 8 and 9 and hydraulic passage 12 to wheel cylinders 13 and 14. In this case, valve mechanisms 26 and 27 are in the disposition shown in FIG. 5 and the forward ends of the intake valves protrude into the hydraulic pressure chambers 5 and 6, respectively. At this time, if the intake sleeves 33 and 34 are disposed at such a position as to allow the intake valves 31 and 32 to be pushed down, valve mechanisms 26 and 27 will be in the state shown in FIG. 6. High pressure brake fluid from pump 23 will then be delivered through the passages 21 and 20 into chambers 5 and 6. The braking hydraulic pressure will push back pistons 3 and 4 up to a position where the intake sleeves 33 and 34 are respectively disengaged from intake valves 31 and 32. The hydraulic pressure in chambers 5 and 6 is proportional to a treading force of the brake pedal 37. In this case, at specific positions of the primary and secondary pistons 3 and 4, intake sleeves 33 and 34 push the intake valves 31 and 32, respectively, downwardly thereby communicating chambers 5 and 6 with the discharge port of pump 23. The hydraulic pressure emanating from the discharge port of pump 23 pushes pistons 3 and 4 back until the intake valves 31 and 32 again close orifices 16 and 17. Therefore, even if a problem occurs in the hydraulic pressure source system, satisfactory hydraulic pressures can be secured in the hydraulic pressure chambers 5 and 6.

(2) Pressure reduction mode (t1→t3)

When the system's speed further decreases, the decay valves DV1 and DV2 are turned on (opened) at time t2. The brake fluid within each wheel cylinder 8, 9, 13 and 14 then flows through passages 10 and 15 to reservoir 11 where it is pressure reduced.

(3) Hold mode (t3→t4)

As a result of pressure reduction in the brake fluid, at time t3, the system speed passes a low peak and starts to restore, the decay valves DV1 and DV2 are turned off (closed) and the hold mode is again set up.

(4) Pressure applying mode (t4→t5)

When the system speed reaches a high peak, the hold valves HV1 and HV2 are turned off (opened), pistons 3 and 4 move so as to open intake valves 31 and 32 so that hydraulic pressure emanating from hydraulic pressure pump 23 is applied through hydraulic pressure chambers 5 and 6 to wheel cylinders 8, 9, 13 and 14. In the pressure applying mode starting at this time point, hold valves HV1 and HV2 are turned on and off at short intervals so that the brake pressure will stepwise increase.

(5) Hold mode (t5→t6)

When the system speed decreases due to the application of brake fluid pressure, the hold mode is again set up. Hold valves HV1 and HV2 are turned on (closed). At t6, the decay valves DV1 and DV2 are turned on (opened) and the pressure reduction mode is set up again.

Figure 10:
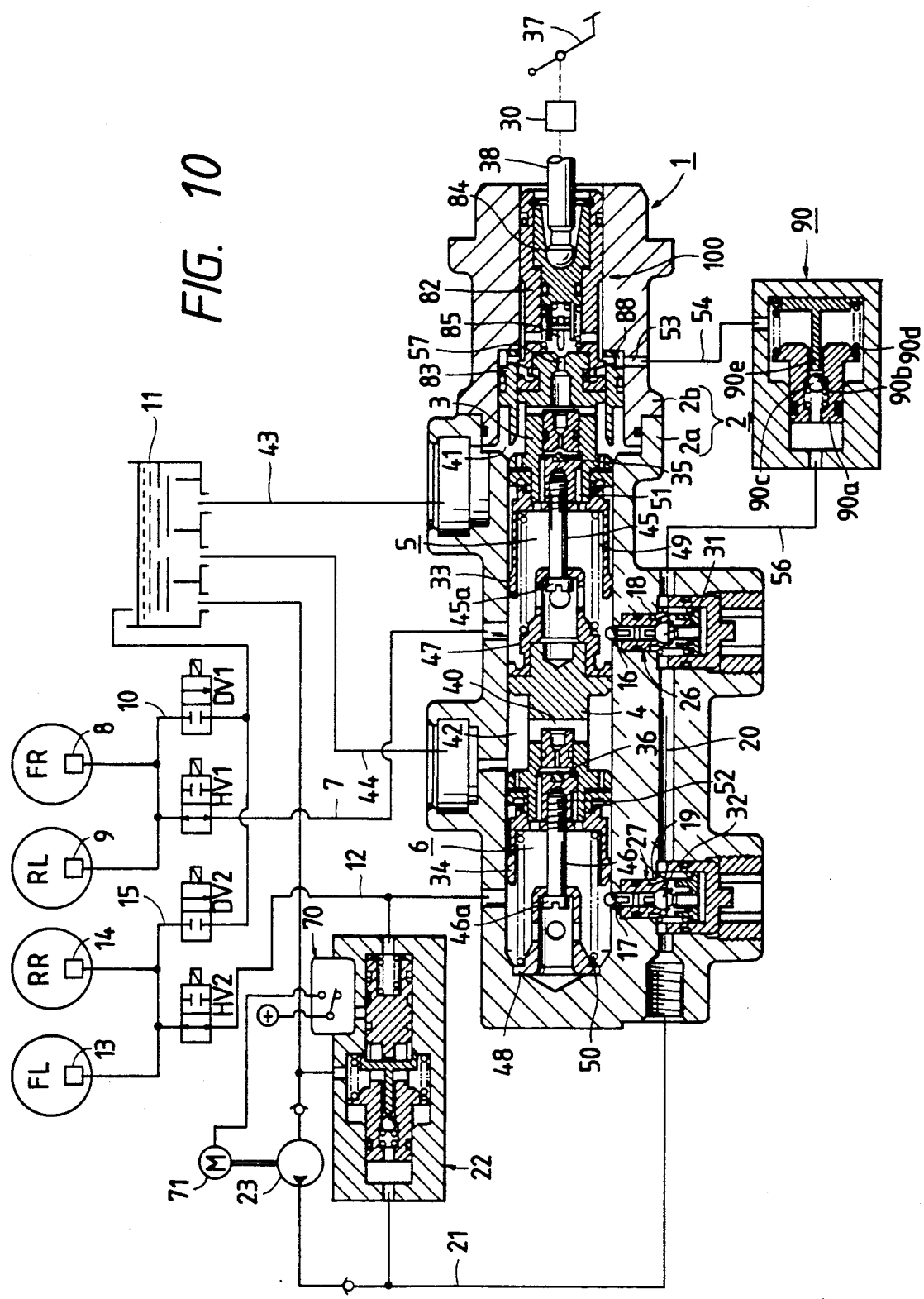
FIG. 10 is a schematic diagram showing an overall arrangement of a brake hydraulic pressure generator in accordance with another embodiment of the present invention.

FIG. 10 is a schematic diagram of a brake hydraulic pressure control apparatus according to another embodiment of the invention. The arrangement and operation of the apparatus are substantially similar to those of the embodiment shown in FIG. 1. In the present embodiment, however, a vacuum booster 30 is disposed between the brake pedal 37 and push rod 38. With the combination of the vacuum booster 30 and booster piston even if trouble occurs in the negative pressure source of the power source for the toggle joint, there is no need for a remarkable increase in pedal stroke. Accordingly, the driver can easily brake the vehicle with a satisfactory braking force.

As is apparent from the foregoing description, the present invention employs a hydraulic booster which can provide the toggle joint effect comparable with that provided with a conventional vacuum booster which is large and expensive. In particular, the combination of the master cylinder and the simple hydraulic booster according to the present invention provides a small and inexpensive brake hydraulic pressure generator. The hydraulic pressure power source of the hydraulic booster may be used for the power source of the integrated type master cylinder. Therefore, that combination is very effectively used.

The second embodiment further employs relief valve 22. Accordingly, there is no need for the conventional large capacity accumulator. The relief spring 22f determines a pressure of the fluid discharged from the hydraulic pressure pump 23. This feature absorbs the impulse pressure generated from the brake fluid is discharged from pump 23. As a result, the operating noise, vibration and the like can be reduced. The resultant apparatus is small, light weight and of low cost. Switch 70 detects the presence or absence of brake fluid pressure at the discharge side of pump 23. The detection result enables a check as to whether or not the hydraulic pressure pump operation is normal or not. At the time of a high deceleration in the normal braking mode, the intake sleeve 33 pushes down on intake valve 31 shown in FIG. 6. As a result, the brake fluid which has a high pressure is supplied to hydraulic pressure chamber 5. By the supplied fluid the switch 70 is operated and the pump 23 is driven. The result is to prevent an increase in pedal stroke and to secure a satisfactory braking force even at the time of the vapor lock. Furthermore, as noted above, the ball valve 22c is seated in the direction of releasing the brake fluid when the valve is opened. Accordingly, the sealing properties are excellent. The hydraulic pressure is placed in a balanced state by the relief spring 22f. Thus, the pressure in passage 21 can be kept constant even when the brake fluid is released. Accordingly, a stable supply of fluid is possible.

Further, the pressure usually acting on the intake valves 31 and 32 is only the pressure corresponding to energization by the relief spring 22f. Thus, no high pressure acts on them thereby improving the durability of seals, for example.

Additionally, since the combination of the vacuum booster and the hydraulic booster is used in accordance with the second embodiment, if trouble occurs in the power source of one of the brake booster systems, high safety can be secured.

While the invention has been described in connection with what is presently considered to be the most practical and preferred embodiment, it is to be understood that the invention is not to be limited to the disclosed embodiment, but on the contrary is intended to cover various modifications and equivalent arrangements included within the spirit and scope of the appended claims.

What is claimed is:

1. A brake system for a vehicle, said brake system comprising:

a brake pedal element;

at least one cylinder body;

at least one hydraulic chamber defined within said cylinder body;

at least one piston provided within said hydraulic chamber for controlling pressure within said hydraulic chamber;

means for operatively coupling said hydraulic chamber to at least one wheel cylinder for applying a braking force to a wheel of the vehicle; and a brake hydraulic pressure generator for amplifying a force applied to said brake pedal element and for applying said amplified force to said at least one piston, said brake hydraulic pressure generator including a first booster piston operatively coupled to said brake pedal element and operatively coupled to said at least one piston for transmitting a force applied to said brake pedal element to said at least one piston, a second booster piston operatively coupled to said at least one piston for transmitting a force to said at least one piston and to said first booster piston, and an auxiliary hydraulic pressure source for supplying hydraulic pressure to said second booster piston to increase said force transmitted to said at least one piston, said auxiliary hydraulic pressure source including a source of hydraulic fluid, a fluid flow passage operatively interconnecting said source of hydraulic fluid and said second booster piston, a pump in said fluid flow passage for selectively pumping fluid through said flow passage from said source of hydraulic fluid toward said second booster piston and means for selectively actuating said pump, wherein said force transmitted from said second booster piston to said at least one piston and to said first booster piston comprises said hydraulic pressure supplied by said auxiliary hydraulic pressure source, and wherein said means for selectively actuating said pump comprises means responsive to pressure within said at least one hydraulic chamber for actuating said pump when a pressure within said at least one hydraulic chamber exceeds a predetermined value.

2. A brake system as in claim 1, further comprising check valve means disposed in said fluid flow passage of said auxiliary hydraulic pressure source for selectively allowing hydraulic fluid to flow to said second booster piston.

3. A brake system as in claim 2, further comprising means for maintaining a predetermined baseline hydraulic pressure in said fluid flow passage.

4. A brake system as in claim 3 wherein said check valve means opens in response to a hydraulic pressure greater than said baseline hydraulic pressure.

5. A brake system as in claim 1, further comprising anti-lock means operatively coupled between said auxiliary hydraulic pressure source and said at least one hydraulic chamber including valve means for selectively applying hydraulic pressure from said auxiliary hydraulic pressure source to said at least one hydraulic chamber.

6. A brake system as in claim 5, wherein said hydraulic pressure is applied to said hydraulic chamber when said at least one piston has moved a predetermined amount within said cylinder body.

7. A brake system as in claim 1, further comprising a vacuum booster operatively coupled between said brake pedal element and said second booster piston.

8. A brake hydraulic pressure generator comprising:
a first booster piston for applying a brake pedal treading force to a brake piston operatively associated with a hydraulic chamber coupled to a wheel cylinder, said first booster piston being operatively coupled to said brake piston so as to apply said brake pedal treading force to said brake piston;
a second booster piston for amplifying said brake pedal treading force applied to said brake piston, said second booster piston being operatively coupled to said brake piston for applying a hydraulic pressure force to said brake piston and to said first booster piston; and
means for supplying a hydraulic fluid from an auxiliary hydraulic pressure source to said second booster piston for urging said second booster piston to apply said hydraulic pressure force to said brake piston and to said first booster piston in response to a pressure generated within said hydraulic chamber, said auxiliary hydraulic pressure source including a source of hydraulic fluid, a fluid flow passage operatively interconnecting said source of hydraulic fluid and said second booster piston, a pump in said fluid flow passage for selectively pumping fluid through said fluid flow passage from said source of hydraulic fluid toward said second booster piston and means for selectively actuating said pump, wherein said means for selectively actuating said pump comprises means responsive to pressure within said hydaulic chamber for actuating said pump when a pressure within said hydraulic chamber exceeds a predetermined value.

9. A brake hydraulic pressure generator as in claim 8, further comprising check valve means disposed in said fluid flow passage of said auxiliary hydraulic pressure source for selectively allowing hydraulic fluid to flow to said second booster piston.

10. A brake hydraulic pressure generator as in claim 9, further comprising means for maintaining a predetermined baseline hydraulic pressure in said fluid flow passage.

11. A brake hydraulic pressure generator as in claim 10 wherein said check valve means opens in response to a hydraulic pressure greater than said baseline hydraulic pressure.

12. A brake hydraulic pressure generator as in claim 8, further comprising anti-lock means operatively coupled between said auxiliary hydraulic pressure source and said hydraulic chamber including valve means for selectively applying hydraulic pressure from said auxiliary hydraulic pressure source to said hydraulic chamber.

13. A brake hydraulic pressure generator as in claim 12, wherein said hydraulic pressure is applied to said hydraulic chamber when said brake piston has moved a predetermined amount.

14. A brake hydraulic pressure generator as in claim 8, further comprising a vacuum booster operatively coupled between said brake pedal treading force and said second booster piston.

15. A brake system for a vehicle, said brake system comprising:
a brake pedal element;
at least one cylinder body;
at least one hydraulic chamber defined within said cylinder body;
at least one piston provided within said hydraulic chamber for controlling pressure within said hydraulic chamber;
means for operatively coupling said hydraulic chamber to at least one wheel cylinder for applying a braking force to a wheel of the vehicle; and
a brake hydraulic pressure generator for amplifying a force applied to said brake pedal element and for applying said amplified force to said at least one piston, said brake hydraulic pressure generator including a first booster piston operatively coupled to said brake pedal and operatively coupled to said at least one piston so as to transmit a force applied to said brake pedal element to said at least one piston, a second booster piston operatively coupled to said at least one piston for transmitting a force to said at least one piston and to said first booster piston, and an auxiliary hydraulic pressure source for supplying hydraulic pressure to said second booster piston to increase said force transmitted to said at least one piston, wherein said force transmitted from said second booster piston to said at least one piston and to said first booster piston comprises said hydraulic pressure supplied by said auxiliary hydraulic pressure source, and wherein said first booster piston moves said at least one piston in response to application of a force to said brake pedal element, and said second booster piston moves said at least one piston only when said auxiliary hydraulic pressure source applies said hydraulic pressure to said second booster piston.

16. A brake hydraulic pressure generator comprising:
a first booster piston for applying a brake pedal treading force to a brake piston operatively associated with a hydraulic chamber coupled to a wheel cylinder, said first booster piston being operatively coupled to said brake piston so as to apply said brake pedal treading force to said brake piston;
a second booster piston for amplifying said brake pedal treading force applied to said brake piston, said second booster piston being operatively coupled to said brake piston for applying a hydraulic pressure force to said brake piston and to said first booster piston; and means for supplying a hydraulic fluid from an auxiliary hydraulic pressure source to said second booster piston for urging said second booster piston to apply said hydraulic pressure force to said brake piston and to said first booster piston in response to a pressure generated within said hydraulic chamber wherein said first booster piston moves said brake piston in response to the application of said brake pedal treading force, and said second booster piston moves said brake piston only when said hydraulic fluid supplying means applies said hydraulic fluid to said second booster piston.

* * * * *